United States Patent [19]
Coleman et al.

[11] Patent Number: 5,421,007
[45] Date of Patent: May 30, 1995

[54] KEY SPACE ANALYSIS METHOD FOR IMPROVED RECORD SORTING AND FILE MERGING

[75] Inventors: Andrew Coleman, Westport, Conn.; John Svedman, Hewitt, N.J.; Kobie Thakar, Valley Cottage, N.Y.

[73] Assignee: Syncsort Incorporated, Woodcliff Lake, N.J.

[21] Appl. No.: 881,764

[22] Filed: May 12, 1992

[51] Int. Cl.$^6$ ............................................. G06F 15/40
[52] U.S. Cl. ............................... 395/600; 364/DIG. 1
[58] Field of Search .......................................... 395/600

[56] References Cited

U.S. PATENT DOCUMENTS 3,697,697  10/1972  Audretsch, Jr. et al. ............ 179/15
5,301,317   4/1994  Lohman et al. ...................... 395/600

OTHER PUBLICATIONS

Savasere et al. "On Applying Classification to Schema Integration" Proc. First Int'l Workshop on Interoperability in Multidatabase Systems, IEEE Comp. Soc. Press, pp. 258–261. 1991.
Donald Knuth, "The Art of Computer Programming" vol. 3, Addison–Wesley, pp. 181–187. 1973.

Primary Examiner—Thomas G. Black
Assistant Examiner—Peter Y. Wang
Attorney, Agent, or Firm—Amster, Rothstein & Ebenstein

[57] ABSTRACT

Key space analysis is provided to improve the merge phase of a sorting process or a computer merge operation where strings of records or files of presorted records are to be merged in order of a key. Key spaces are identified as strings or groups of strings, files or groups of files, whose range of entries does not overlap the range of entries of another key space. The strings or files within each key space are then combined and/or merged, as needed, independently of strings or files in other key spaces, and written directly to the output destination.

23 Claims, 3 Drawing Sheets

KEY SPACE ANALYSIS METHOD FOR IMPROVED RECORD SORTING AND FILE MERGING

The invention is a method for reducing the time and computer resources needed to merge sorted strings during the merge phase of a computer sorting operation or to merge files during a computer merge operation.

BACKGROUND OF THE INVENTION

The sorting of records located in a computer's various memory locations, and/or input to a computer, can require the appropriation of a large percentage of the computer's resources during the sorting operation for a prolonged period of time. Similarly, the merging of files requires significant computer resources for a long period of time. For these and other reasons, there is a need to develop sorting and merging methods which minimize both the physical resources which must be dedicated to the operations and the elapsed time.

The sorting process, stated broadly, involves four distinct stages or phases of operation: the initialization phase; the reading and string sorting phase including the alternating stages of reading the records into the computer and sorting the records into strings; the merge and output phase involving merging the strings and writing the records to the designated output file in sorted order; and the clean-up phase. To facilitate an understanding of both the background technology and the present invention, several of the uniquely-defined terms of the art are outlined below:

- string sort: a process or subprocess the primary function of which is to take a set of data records and a specified key and rearrange the records to produce a sorted string;
- key: a field, or collection of fields, which may reside in each of a collection of computer data records or be appended thereto in accordance with the user specification, the value of which determines the desired order of the records (an example being: the first character of a data record, to be sorted in alphabetical order);
- section: a portion of the input file, whose order with respect to the key field is unknown;
- string: a collection of records sorted in the order of the key;
- merge: a process or subprocess whose primary function is to take multiple strings which were previously ordered on the same key and combine them into a single string ordered on that key;
- internal sort: a sort in which all of the records to be sorted are contained within the computer's internal memory at one time;
- external sort: a sort in which the space required for all the records to be sorted exceeds the available computer memory space; whereby sections of the input data must be read into the computer, sorted into strings and the strings stored in a temporary file, later to be merged with the other sorted strings;
- pass: the merging of some number of sorted strings, which may be less than or equal to the total number of sorted strings; and
- multiple pass merge: a merge phase that requires more than one pass in order to completely merge all data, the output of intermediate passes being sent to a temporary file.

A text which details the techniques of computer sorting is *The Art of Computer Programming*, Vol. 3 subtitled "Sorting and Searching" by Donald E. Knuth, Addison-Wesley Publishing Co., Inc. (Menlo Park, Calif., 1973, the teachings of which are hereby incorporated by reference.

The sorting process steps, as mentioned above, commence with an initialization phase. Initialization involves the planning or selecting of an I/O (input/output)strategy and a sort strategy based upon the user-supplied information of the names of the input and sorted output files, the number and size of input records to be sorted, the fields in the input data by which the records will be sorted (i.e. the key), and the "computer-supplied" information of the amount of memory space available for records and strings of records.

The next phase of the sort operation is the reading and string sorting phase. The records are read into the computer's memory, unless already resident therein, and are ordered, or sorted, according to their key value and thereby "assembled" into strings. In this way, the string sorting phase generates one or more strings. If all of the records cannot be held in the computer's internal memory at one time, then some of the generated strings must be stored in a temporary file while successive sections of the input file are processed.

When the reading and string sorting phase produces more than one string, the merge phase is performed. Some number of data records from each of the sorted strings is read (if external), merged and sent to the output phase. This process is repeated until all records have been merged. The output phase sends the records to the output destination, as specified by the user, which destination may be a file, user-program, or peripheral.

When there are more strings input to the merge phase than can be merged together at one time, it is necessary to perform several passes in the merge phase in order to merge all of the sorted strings. In this case, the output of each intermediate pass may be sent to a temporary file, later to be merged with other strings. In the case of multiple passes, the final pass is as described above, with the output of the merge of intermediate strings being sent to the output destination. It is beneficial to reduce the number of strings entering the merge phase, because a larger number of strings can require a multiple pass merge phase, and because a larger number of strings necessitates a larger number of compare operations per record in the merge phase. [See Knuth, supra, Chapter 5.3].

One technique, which has been used in the art to reduce the number of strings to be merged, is to concatenate strings for which the highest key value of one string is lower than the lowest key value of another. For example, as conceptually illustrated in FIG. 3A, in the instance of merging six strings input to the merge including: AARON through HOYLE, BROWN through JACOB, LOWRY through MASON, MORSE through OCEAN, MYERS through SMITH and ROGER through ZELDA, it is possible to concatenate strings. Line 40 indicates the fact that the six strings will be treated as two strings. Specifically, AARON through HOYLE, LOWRY through MASON, MORSE through OCEAN and ROGER through ZELDA can be concatenated into a single string. Similarly, BROWN through JACOB and MYERS through SMITH can be concatenated. Thence, only two strings remain to be merged rather than six. The information as to the highest and lowest key values for each string may have been saved off in a list during the sort phase, as illustrated at 16 in FIG. 1, or may be gathered at the start of the merge phase by reading in the first and last records of the string.

The present invention addresses the merge phase of the overall sort process and provides a superior method for merging the sorted strings, the method being equally applicable to the merging of files in a computer merging operation. For the sake of clarity of description, the file merging example will not be referred to continually; rather, in the use of the term "strings", the analogous "files" will be understood to be included. Where applicable, the generic term "sets" will be used to include both strings of sorted records and files of sorted records. The invention provides a method which can beneficially reduce the number of compares to which any single record is subjected, reduce the number of merge passes required to completely merge the records, and decrease the number of I/O operations necessary to complete the sort and/or merge.

It is therefore an objective of the present invention to provide a method of conducting a sorting operation using fewer of a computer's resources and less time than prior art sorting techniques.

It is another objective of the invention to provide a new method of conducting the merge phase of a sort process.

It is still another objective of the invention to provide a new method of conducting a computer file merge operation.

Another objective of the invention is to provide a merge process with a reduced number of passes in a multiple pass merge.

A further objective is to increase the buffer size available during a merge operation or merge phase.

It is yet another objective to reduce the number of strings that are merged to an intermediate storage location, thereby reducing the reading and writing of data during a multiple pass merge phase.

Still another objective of the invention is to consider only a subset of the data at one time during the merge phase, thereby reducing the number of comparisons during the merge phase.

SUMMARY OF THE INVENTION

These and other objectives are realized by the present invention wherein the merge phase is improved by a new procedure called key space analysis. A key space is defined as a string or group of strings whose key values do not overlap those of any other string or group of strings. In the sort operation, once a section of records has been sorted on a key and a string generated, its lowest and highest key values can be determined. The lowest and highest key values can be included in a list of entries. The list of entries is then sorted on key values. Using the sorted key value entries, key spaces are identified, each of which will consist of one or more strings. The strings within each key space are merged, independently of strings in the other key space, and written directly to the output destination. The first key space will contain the data that will be sent first to the output destination; the second key space will contain the data that will be sent next to the output destination; etc. The goal of reducing the number of strings to be merged at one time is therefore realized. The reduction of the number of strings which must be considered at one time in the merge phase is beneficial since it reduces the likelihood of multiple passes, reduces the number of comparisons needed to determine the next record to be delivered to the output stream, and can reduce the number of I/O operations.

BRIEF DESCRIPTION OF THE DRAWINGS

The invention will now be described in further detail with reference to the accompanying drawings wherein.

DETAILED DESCRIPTION OF THE PREFERRED EMBODIMENTS

Figure 1:
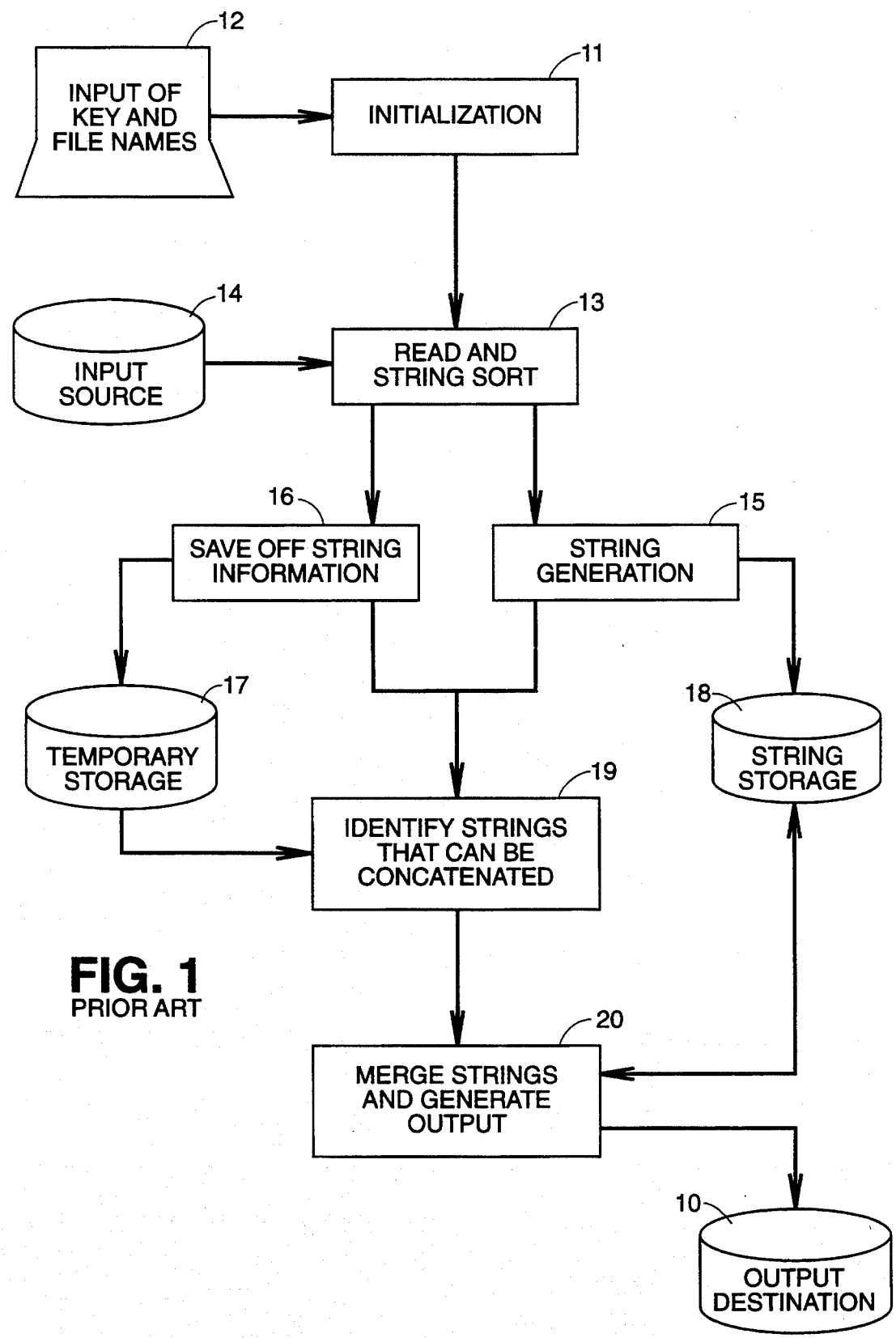
FIG. 1 is a flow diagram illustrating the sequence of steps and subprocesses utilized by a sort operation in accordance with the prior art.

In a prior art sorting operation, as illustrated in FIG. 1, the sort is conducted in four distinct steps or phases. Initialization, at 11 in FIG. 1, is conducted once the program has received the instructions or other input from another processor, operator at a terminal or other input means, as illustrated at 12. The details of the initialization phase are known to one having skill in the art and are not altered by the present invention. No further level of detail will be recited, therefore; as further detail with regard to the "peripheral" features of the known technology could only serve to obscure the invention.

After initialization, the prior art sort proceeds to the reading and string sorting phase, at 13 of FIG. 1, wherein sections of the input data to be sorted are input from external or internal storage, or input directly, from input source 14. The number of records included in a section will vary depending upon the length of the records, the available memory space and the sort requirements. Once again, these details are the subject of other patents and publications available in the art with respect to the initialization and execution of sort processes. It is not integral to the present invention that a specific quantity of records be involved. What is a presumption in the description that follows is that the input stream is divided into sections, each section being the subject of a string sort phase whereby the records in the section are sorted into a string, and the string generated by the string sort of each section is stored while successive records are similarly sorted into strings and stored, until all of the records have been sorted into strings. As illustrated at 15, the string sorting phase includes generating strings of sorted records which may be stored, at 18, in temporary storage while successive sections are sorted.

The strings are retrieved at the merge phase, illustrated at 20. Step 16, the "saving off" of string information to temporary storage 17, is an additional process step which is incorporated in prior art sorting processes which utilize string concatenation, as discussed above. Information with regard to the high and low key values for each string is saved, at 16, stored, at 17, and used, at 19, to identify strings which can be concatenated prior to merging. The locations of the temporary storage, for the strings and for the key value information, are selected according to techniques which are well known in the art and are wholly outside of the scope of this invention.

During the merge and output phase, 20, the strings of sorted records are merged to produce the output stream. If it is determined, after the read and string sort phase, that the strings may be concatenated into a single string, no merge phase is necessary and the string can be directly output in essentially a copy step. If the strings cannot be concatenated into a single string, the key value of the first record of each string is provided to the central processing unit (CPU), from temporary storage 18 if the strings are not located in the CPU's memory, and compared to that of every other string, with the record having the lowest key value being delivered to the output stream. The record that is delivered to the output stream is replaced by the next record in its string and comparisons are performed again. This process continues until all records have been merged. As noted above, in the case of a large amount of data and therefore a large number of sorted strings, the merge phase can involve more than one pass in order to merge all of the sorted strings. If the merge phase involves multiple passes, the output of each intermediate pass is stored in a temporary string storage file, 18. The temporary file, 18, need not be the same file as that used for the temporary storage of the sorted strings, as it is illustrated in FIG. 1. On the final pass (which is the first for a single-pass merge), the output stream is sent to the user-specified destination, for example an output file as is illustrated at 10.

A "clean-up" phase is also generally included in the sort process to close out files, etc., the details of which are not integral to the subject invention and are therefore neither illustrated nor taught herein.

In accordance with the prior art, even when concatenating of strings has been employed, if the strings cannot be concatenated into a single string, the merge phase requires that each record in a string be the subject of comparisons with records of other strings, if any. Using the example discussed above and illustrated in FIG. 3A, in the instance where the records are to be sorted on an alphabetical key, if there are six strings to be merged, AARON through HOYLE, BROWN through JACOBS, LOWRY through MASON, MORSE through OCEAN, MYERS through SMITH and ROGER through ZELDA, using the known concatenation procedure, strings above line 40 would be concatenated to form a single string AARON through ZELDA which would then be merged with the string, BROWN through SMITH, formed by concatenating the strings below line 40. The strings could be concatenated into a single string since the highest entry of each of the subsequent strings is lower than the lowest entry of the previous string. Although the number of strings which must be considered at one time in the merge process is reduced, each record in the two resultant strings must be the subject of the iterative comparisons of the merge phase. The present invention, however, takes advantage of the fact that not all of the records of a string need to be "looked at" individually, as will now be detailed further with specific reference to the process flow illustrated in FIG. 2.

Figure 2:
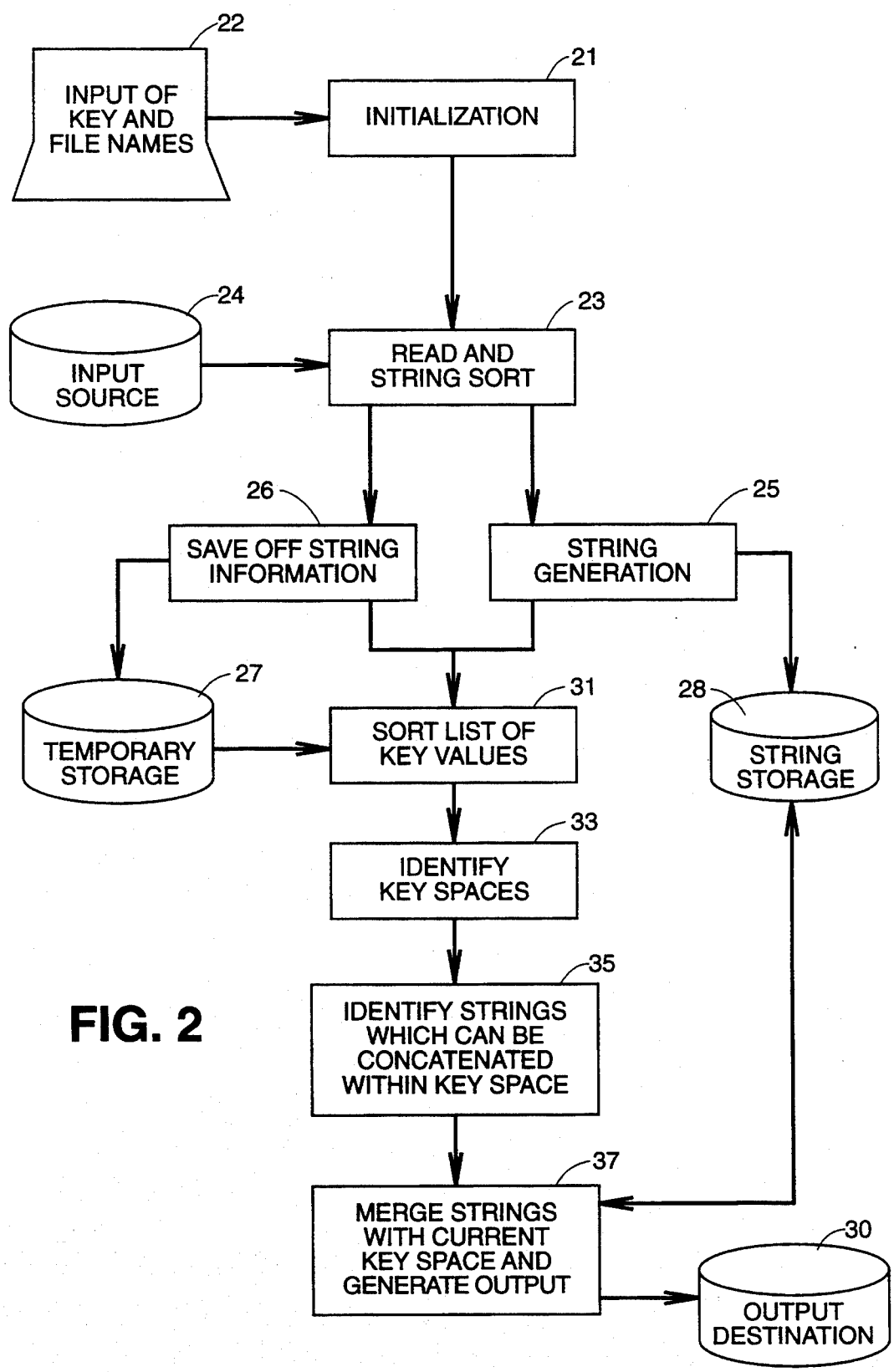
FIG. 2 illustrates the sequence of steps utilized in the inventive sort process.

As in the prior art, input is provided to the CPU from one of a variety of sources, illustrated schematically at 22, for use during the initialization phase, 21, which does not differ from the prior art. The input files, 24, are read in and sorted in the same manner as in the prior art until all of the sections have been read in, string sorted into strings and stored, during the Read and String Sort step illustrated at 23. (FIG. 2 illustrates two storage locations, 28 and 27, for storage of the strings and of the array entries, respectively. Actual location of the stored information is not integral to the invention, assuming that the information is readily accessible to the CPU.)

The step of saving off the key value range for each string, which may be performed in the prior art in order to facilitate the concatenation of strings, can also be used for the present process as illustrated at 26. If at least two sorted strings have been generated, analysis of the key value information for each string, as stored illustratively at 27 or retrieved directly from the strings, is performed. One way to implement this analysis is to create a list of information about each string in a pair of information for each element. The saved elements of the pair include the high or low key value for the string, any information needed to identify the string, and a high-low designator. Arbitrarily, and for the sake of example, high-low designators for low keys can be the value −1 and for high keys the value +1. In the example of a string comprised of the sorted records BROWN through JACOB, sorted in ascending order, BROWN would be assigned a high-low designator of −1 and JACOB would be assigned a high-low designator of +1. (It is to be noted at this juncture that the terms high and low are relative within the sort as defined at the start of the process. If the same records as are used for illustrative purposes here were to be sorted in descending rather than ascending order, then the high and low values would be assigned in opposite manner. This somewhat semantic distinction has no effect on the invention or the implementation thereof.)

The list of high and low key values is retrieved from the storage location, 27, (or from the strings) and sorted using a standard stable sort algorithm at step 31. Once the list has been sorted, the key space analysis can commence, at 33.

The key space analysis identifies a key space as consisting of those strings or series of strings which have no key values which overlap the key values of strings or series of strings which define another key space and which will not therefore need to be merged with strings in another key space. With the implementation described above, in which high-low designators are included in each entry of the sorted list, the saved key values are not needed again in identifying key spaces. Instead, the high-low designator associated with each high or low key value can be accessed in the sorted order and added to an accumulator. Whenever an equal number of low designator entries (−1) and high designator entries (+1) have been found, the value of the accumulator will equal zero (0). Once a zero result has been encountered, as the sorted key entries are sequentially evaluated, the end of a key space has been identified. The key space is entered in a list, note is made of the strings that comprise the key space, and the process continues. Sequential evaluation of the sorted entries continues until all of the key spaces have been identified.

It is possible that a key space be comprised of a single string. In this limiting case, the merge step for this key space effectively becomes a copy step, and it is therefore not necessary that every record entry in the key space be the subject of merge comparisons. The time and resource savings are evident from the fact that fewer comparisons need to be made for the overall merge process.

Figure 3A:
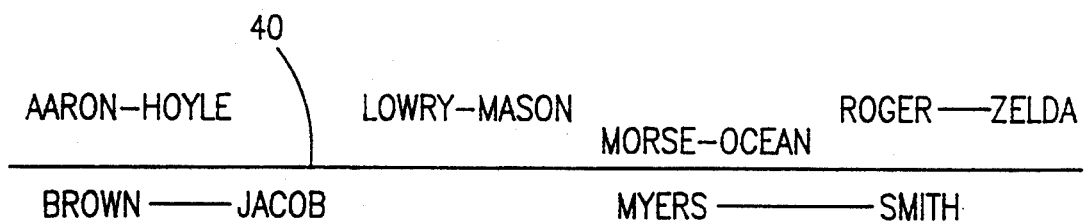
FIGS. 3A and 3B illustrate grouping of strings in accordance with the prior art method of combining strings and the present key space analysis invention, respectively.
Figure 3B:
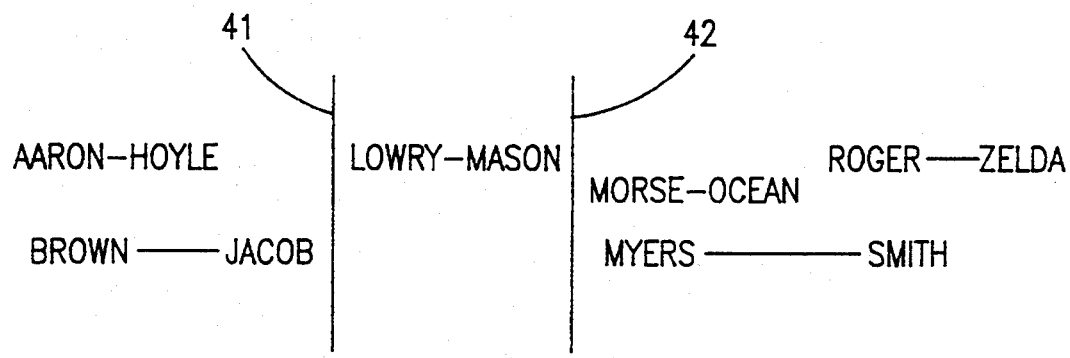

To use the example set forth earlier, with the strings illustrated in FIGS. 3A and 3B, the high aria low entries would be sorted into the order AARON, BROWN, HOYLE, JACOB, LOWRY, MASON, MORSE, MY- ERS, OCEAN, ROGER, SMITH, ZELDA. A corresponding listing of the high-low designators for those entries would be $-1, -1, +1, +1, -1, +1, -1, -1, +1, -1, +1, +1$ (wherein the low entries for each string, AARON, BROWN, LOWRY, MORSE, MYERS and ROGER, respectively would have $-1$ designators and the high entries for each string, HOYLE, JACOB, MASON, OCEAN, SMITH and ZELDA would have designators of $+1$). As the list of designators is processed and the values of the designators are provided to an accumulator, the first instance of a 0 would be after combination of the first four entries ($-1, -1, +1, +1$). Therefore, a key space, defined by the strings AARON through HOYLE and BROWN through JACOB, is defined. When the value of the accumulator equals zero [0], it indicates the end of the current key space and the start of the next key space. As noted above, once the key space has been defined, the key space information, the pointers and other information needed to identify the strings which comprise the key space, is saved and the key space analysis continues until all key spaces have been identified and the information saved. In the present example, subsequent to saving the key space information for the key space defined by AARON through JACOB, the entries LOWRY, with a desingator of $-1$, and MASON with a designator of $+1$ would be provided to the accumulator and would be seen to define the next key space. Finally, the sequence $-1, -1, +1, -1, +1, +1$ equals zero defining the key space from MORSE through ZELDA. Since the list entries being analyzed are in sorted order, the consecutively identified key spaces will be in a sorted order as well. FIG. 3B conceptually indicates the delineation of key spaces, divided by lines 41 and 42, where no overlapping of records are encountered.

If, after key space analysis, any key space contains more than one string, then the strings within each key space must be merged. It is beneficial to first consider whether strings within the key space may be concatenated. Once the key spaces have been defined, the list of high and low keys can be used to determine whether strings within a key space can be concatenated, at 35. For example, within the key space that is defined by the overall range from MORSE to ZELDA, there are three strings: MORSE through OCEAN, MYERS through SMITH and ROGER through ZELDA. It is possible to concatenate two of the strings MORSE through OCEAN and ROGER through ZELDA. The merge phase for this key space will then require comparing only the two resultant strings MORSE through ZELDA and MYERS through SMITH. The technique used for concatenating strings within a key space is to perform the following process until no low key entries remain in the list: search the list of entries for the key space looking for an entry with a $+1$ designator; when found, search for the next entry with a $-1$ designator; and, combine the two strings. In the above example, the first $+1$ designator encountered is OCEAN, the $+1$ high entry for the MORSE through OCEAN string. After OCEAN, the next $-1$ designator encountered is ROGER, the $-1$ low entry for the ROGER through ZELDA string. It is appropriate to then concatenate the successive string with the low value to the end of the string with the lower high value. As strings within a key space are combined in this manner, the designator of the low entry is changed to some value other than $+1$ (for example, zero) so that it will not be selected again.

Once the key spaces have been defined, and strings within a key space concatenated when possible, the strings which comprise the key space are merged, at 37 of FIG. 2. This merge does not differ from that performed in the prior art. As the strings within each key space are merged, the output stream is sent to the user-specified output destination, 30. This process continues until all key spaces have been merged and sent to the output destination. Since there is, by definition, no need for merging among the key spaces, the output stream for each single string key space can be generated without comparing any of the records in the string.

With the prior art, as noted above, the merge phase requires that each of the sorted strings be considered when merging. For example, in the instance where the records are to be sorted on an alphabetical key, if there are six strings to be merged, a six-way merge is performed on these sorted strings. Alternatively, if the more sophisticated prior art of concatenating strings is used, the strings would be combined as in FIG. 3A into AARON through ZELDA and BROWN through SMITH. Each of the records in the two resultant strings must be subjected to the merge compare steps. In this example, concatenating strings means that the number of strings merged over the whole merge phase remains constant at two, and every record is subjected to the comparisons of the merge process. With the present invention, key space analysis is performed, and three key spaces are identified. FIG. 3B illustrates the key space comprised of the strings AARON through HOYLE and BROWN through JACOB, the separate, single string, key space of LOWRY through MASON, and the key space of MORSE through ZELDA and MYERS through SMITH. The first two strings AARON through HOYLE and BROWN through JACOB can be merged to produce the first part of the output stream without considering the records contained in the other key spaces. The records contained in the second key space, LOWRY through MASON, can be copied directly to the output stream without considering the records contained in the other two key spaces. Finally, the concatenated string MORSE through ZELDA can be merged with MYERS through SMITH and the records output directly. Key space analysis clearly provides an advantage over the prior art. By applying key space analysis, the number of strings merged is reduced to one for part of the merge phase with no record comparisons required. With the prior art, either six strings will be considered for all of the merge phase, or in the case of concatenating strings, two strings will be considered for all of the merge phase.

In general, therefore, the identification and handling of key spaces as separate entities will yield improved results over the prior art. In one specific application of key space analysis, however, the combining of strings is done across the separate key spaces. If, after identifying the key spaces and prior to merging strings within each of the key spaces, the number of strings in each of two or more consecutive key spaces is the same, the strings from the two or more key spaces can be combined. It is known, by the identification of the strings as belonging to separate key spaces, that all of the records for all of the strings in a lower key space are lower than all of the records for all of the strings in the higher key space. Therefore, any one string from the lower key space can be concatenated with any of the strings from the higher key space. Given an equal number of strings in each of the involved key spaces, the combination of the key spaces can be effected which thereby creates a new broader key space. Merging of the strings within the new key space may then be undertaken and, in the instance of a single merge pass, be directly output. The advantage to the combination by concatenation of equal numbers of strings across separate key spaces relies on the presumption that the overhead costs when completing the merging and outputting of strings in one key space and commencing operations on the next key space can be reduced significantly by treating the consecutive key spaces as one. This is a data-dependent presumption which will not be applicable to all key spaces. At the present time, it is seen to be advantageous when the equal number of strings in consecutive key spaces is one. In the instance where the one string comprising a key space is combined with another single string key space, it is apparent that overhead/processing savings can be realized. Extension of the concept to key spaces having equal numbers of more than one string will be advantageous only in specific circumstances.

In sort utilities, it is common to include a feature whereby duplicate records are eliminated. The user may opt to eliminate all records with the same key value, but one. A stable sort algorithm will sort equal high and low key values in such a manner that they will be in their original order relative to each other after the sort. Assume the sort phase for such an application produced two sorted strings: AARON through CAROL and CAROL through HOYLE. The strings can be treated as residing in separate key spaces or as comprising a single key space. It may be easier to process these strings as one key space than to retain the information that CAROL exists in two key spaces. In this case, therefore, the high-low designators are modified in order to prevent identification of a key space on an equal key. For applications using the duplicate key feature, high-low designators of +2 and −2 can be used for the high and low entries respectively. Further, if the highest key of one string equals the lowest key of another, the designator of the low entry can be changed to −1 and the designator of the high entry changed to +1, if it is desired that the equal keyed values be included in the same key space. If the duplicate key feature is implemented in such a way that a key space can end with the same key value with which the next key space begins, and it is therefore appropriate that equal keyed values exist in separate key spaces, then the high and low key values will be assigned the designators as previously discussed.

An example of a pseudo-code for use in implementing the key space analysis step, including stages 26, 31 and 33 of FIG. 2, in a sort wherein the duplicate key feature is to be employed, is found below:

```
begin key space analysis
    construct an array with size equal to 2 * number of
    strings
    initialize each pair of array entries as follows:
        1st element:
            key_ptr=pointer to lowest key in current
            string
            key_designator= −2
            string_ptr=pointer to needed string
            information
        2nd element:
            key_ptr=pointer to highest key of string
```

-continued
```
            key_designator= +2
            string_ptr=pointer to needed string
            information
    sort the array, using stable algorithm- for an
    application with elimination of records with duplicate
    keys, where the key break might be identified, change
    the high designator to +1 and the low designator to −1
    initialize key_space_indicator to 0
    initialize key_space_start to 0
    do while any entry in the array not examined
        add key_designator fields of next two array entries to
        key_space_indicator
        if key_space_indicator equals 0
            save off info. that key_space_start starts a key
            space
            next entry of the array becomes current entry
            set key_space_start to next unexamined entry
        endif
    end do while
end key space analysis.
```

It will be apparent to one having skill in the relevant art that the specific steps may be varied without departing from the inventive concept to which the appended claims direct themselves. As an example, the high-low designators may be represented by a letter or other identifier which is not necessarily a positive and/or negative integer. In such case, an accumulator may not be the specific tool used to recognize the balance of the represented high-low designators in defining a key space. Such modification, and others not specifically discussed herein but nonetheless within the purview of one having ordinary skill in the art, would fall within the scope of the appended claims.

What is claimed is:

1. A method for a computer to merge sets of records on a key, each of said sets comprising presorted records having a first range of key values from a low key value to a high key value, comprising the steps of:
    (a) identifying one or more key spaces each having a second range of key values, each key space comprising one or more sets whose first range of key values overlap the first range of key values of other sets in said key space and wherein said second range of key values for said key space does not overlap the first range of key values of any other sets; and
    (b) taking each key space in key value order and independently merging the sets within each of said key spaces whose key space includes more than one set.

2. The method of claim 1 further comprising outputting the sets for each of said key spaces in order of said key.

3. The method of claim 1 wherein identifying of said key spaces comprises:
    (a) creating a list of entries comprising one entry for each low key value and one entry for each high key value for all of said sets;
    (b) sorting said list of entries into key value order; and
    (c) defining as key spaces any set or group of sets whose range of key values do not overlap the range of other sets.

4. The method of claim 3, wherein said sets for each of said key spaces are output in said key value order.

5. The method of claim 3 wherein said creating of said list of entries further comprises assigning a first high-low designator value to each of said low key values and a second high-low designator value to each of said high key values.

6. The method of claim 5 wherein said defining of key spaces comprises accumulating said high-low designator values in said key value order and identifying a key space whenever a predetermined value of accumulated high-low designator values is encountered.

7. The method of claim 6 wherein each of said high-low designator values is an integer and said first high-low designator value is a negative value for said integer and said second high-low designator value is a positive value for said integer.

8. The method of claim 7 wherein said predetermined value of said combined high-low designator values is zero.

9. The method of claim 1 further comprising, prior to said merging of sets within said key spaces comprising more than one set, concatenating at least a first and a second set in said key space when the low key value for said second set is higher than the high key value for said first set.

10. The method of claim 1 wherein each of said sets comprises a string of presorted records.

11. A method for a computer to sort records on a key, each of said records having a key value, comprising the steps of:
(a) reading less than all of said records into said computer;
(b) sorting said less than all records in key value order and generating a string, the records of said string being sorted on said key from a first key value to a second key value;
(c) saving said first key value and said second key value for said string and an identifier for said string;
(d) storing said string;
(e) repeating steps (a) through (d) for all records;
(f) creating a list of entries comprising one entry for each first key value and one entry for each second key value each entry accompanied by said string identifier for all strings;
(g) sorting said list of entries in key value order;
(h) identifying a plurality of key spaces each comprising one or more strings whose key values overlap, said plurality of key spaces being in key value order;
(i) taking each key space in key value order and independently merging said strings for each of said key spaces; and
(j) outputting said merged strings in order of said key.

12. The method of claim 11 wherein said creating of said list of entries further includes assigning a first high-low designator value to each of said first key values and a second high-low designator value to each of said second key values.

13. The method of claim 12 wherein said identifying of said key spaces comprises accumulating said high-low designator values in key value order and identifying a key space whenever a predetermined value of accumulated high-low designator values is encountered.

14. The method of claim 12 wherein said high-low designator value is an integer and said first high-low designator value is a negative value for that integer and said second high-low designator value is a positive value for that integer.

15. The method of claim 14 wherein said identifying of said key spaces comprises combining said high-low designator values in said key value order and identifying a key space whenever the combined value is zero.

16. A method for a computer to merge sets of records on a key, each of said sets comprising presorted data being sorted in key value order having a first range of key values from a first low key value to a first high key value, comprising the steps of:
(a) identifying one or more key spaces each having a second range of key values from a second low key value to a second high key value and each comprising one or more sets whose first range of key values overlaps the first range of key values of sets within said key space, while said second range of key values does not overlap the first range of key values of any other sets not in said key space;
(b) ordering said key spaces by second range of key values;
(c) identifying consecutive key spaces whereby a first identified key space has the same number of sets as a second identified key space and wherein the second high key value of said first identified key space is lower than the second low key value of said second identified key space;
(d) combining consecutive key spaces having the same number of sets by concatenating each set from a first identified key space to a set from said second identified key space, thereby creating a combined key space including the range of values from said first identified key space and the range of values from said second identified key space; and
(e) merging sets for each of said key spaces whose key space includes more than one set.

17. The method of claim 16 further comprising outputting the sets for each of said key spaces in order of said key after said merging.

18. The method of claim 17 wherein identifying of said key spaces comprises:
(a) creating a list of entries comprising one entry for each of said high and each of said low key values for all of said sets;
(b) sorting said list of entries into key value order; and
(c) defining as key spaces any set or group of sets whose range of key values do not overlap the range of other sets.

19. The method of claim 18 wherein said sets for each of said key spaces are output in said key value order.

20. The method of claim 18 wherein said creating of said list of entries further comprises assigning a first high-low designator value to each of said first key values and a second high-low designator value to each of said second key values.

21. The method of claim 20 wherein said identifying of key spaces comprises accumulating said high-low designator values in said key value order and identifying a key space whenever a predetermined value of accumulated high-low designator values is encountered.

22. The method of claim 21 wherein said high-low designator value is an integer and said first high-low designator value is a negative value for said integer and said second high-low designator value is a positive value for the integer and wherein said defining of a key space occurs when said predetermined value of said accumulated high-low designator values reaches zero.

23. The method of claim 17 wherein each of said sets comprises a string of presorted records.

* * * * *